United States Patent [19]

Barda et al.

[11] Patent Number: 4,476,267
[45] Date of Patent: Oct. 9, 1984

[54] HIGH IMPACT POLYSTYRENE CONTAINING HALOPHENOXYALKYLSILANE FLAME RETARDANT

[75] Inventors: Henry J. Barda, North Brunswick; Saadat Hussain, East Brunswick, both of N.J.

[73] Assignee: Ethyl Corporation, Richmond, Va.

[21] Appl. No.: 547,783

[22] Filed: Nov. 2, 1983

[51] Int. Cl.³ .............................................. C08L 25/06
[52] U.S. Cl. .................................... 524/265; 524/261; 524/267; 524/269
[58] Field of Search ................ 524/265, 261, 267, 269

[56] References Cited

U.S. PATENT DOCUMENTS

| | | | |
|---|---|---|---|
| 3,492,328 | 1/1970 | Kötzsch | 556/471 |
| 3,509,090 | 4/1970 | Miller | 524/263 |
| 3,546,267 | 12/1970 | Ismail | 556/471 |

OTHER PUBLICATIONS

Ismail et al., J. Organometal. Chem., vol. 10 (1967) pp. 421-426.

*Primary Examiner*—Maurice J. Welsh
*Attorney, Agent, or Firm*—Donald L. Johnson; John F. Sieberth; Teresa M. Stanek

[57] ABSTRACT

A flame retarded high impact polystyrene composition having improved izod impact strength. The high impact polystyrene composition of the present invention contains a flame retardant amount of a halophenoxyalkylsilane. The preferred halophenoxyalkylsilane is bis-(2,4,6-tribromophenoxy)dimethylsilane. Antimony oxide may optionally be present.

4 Claims, No Drawings

HIGH IMPACT POLYSTYRENE CONTAINING HALOPHENOXYALKYLSILANE FLAME RETARDANT

BACKGROUND OF THE INVENTION

1. Field of the Invention

The present invention relates to a flame retardant high impact polystyrene composition. More particularly, this invention relates to a flame retarded high impact polystyrene composition containing a flame retardant amount of a halophenoxyalkylsilane. Antimony oxide may also be present.

2. Description of the Prior Art

A variety of halophenoxyalkylsilanes are known to possess fire-retardant, fungicidal, phytotoxic, bactericidal and insecticidal properties. The preparation of these compounds have been reported in a number of U.S. patents and literature articles.

U.S. Pat. No. 3,492,328 teaches a process for the preparation of a halogenated tetraphenoxysilane of the formula

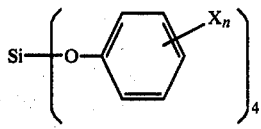

wherein X represents fluorine, chlorine or bromine and n is a whole number of from 3 to 5. U.S. Pat. No. 3,546,267 also teaches a process for the preparation of halogenated phenoxysilanes. Further techniques on the preparation of these types of compounds is discussed in "(Halophenoxy)silanes VIII" by Ismail and Koetzsch in *J. Organometal. Chem.*, 10 (1967) 421-426.

U.S. Pat. No. 3,509,090 claims the use of a wide variety of halogenated organosilane compounds as flame retardant additives in polycarbonate compositions. Examples 12 to 19 identify several other polymer systems where the halogenated organosilane compounds are effective flame retardants.

None of the above-identified references teach or suggest the use of any type of halogenated organosilane in high impact polystyrene (HIPS). The present invention claims the use of a flame retarding amount of a halophenoxyalkylsilane in high impact polystyrene. When a halophenoxyalkylsilane is incorporated in high impact polystyrene in the presence of antimony oxide as a synergist, the resulting formulation is not only flame retarded but retains Izod impact strength comparable to that shown by the original resin. Other flame retardants which are used in high impact polystyrene drastically reduce the impact strength of the composition. The halophenoxyalkylsilane flame retardants used in the practice of the present invention reduce the glow and increase char formation during burning while retaining good physical properties.

SUMMARY OF THE INVENTION

According to the present invention a flame retarded high impact polystyrene composition having improved Izod impact strength is obtained by the addition of a flame retarding amount of a halophenoxyalkylsilane to a high impact polystyrene composition.

DESCRIPTION OF THE PREFERRED EMBODIMENTS

High impact polystyrene (HIPS) is included in the broad class of styrenic polymers. The adjective "high impact" infers that rubber is included in the polymer system. The term "high impact polystyrene" as used in this application is used to broadly refer to rubber modified graft copolymers or homopolymers of styrenic compounds. For example, high impact polystyrene may be copolymerized with other styrene monomers, such as styrene and lower alkyl substituted styrene (e.g. p-methylstyrene).

Thus the high impact polystyrene intended in the practice of the present invention may be a homopolymer, copolymer or block polymer, and is formed from such vinyl aromatic monomers as styrene, ring-substituted methyl- or polymethylstyrenes, ring-substituted ethyl- or polyethylstyrenes, ring-substituted propyl- or polypropylstyrenes, ring-substituted butyl- or polybutylstyrenes, ring-substituted mixed polyalkylstyrenes wherein the alkyl groups differ from each other, ring-substituted chloro- or polychlorostyrenes, ring-substituted alkyl- or polyalkylchloro- or polychlorostyrenes in which the alkyl group(s) contain(s) from one to four carbon atoms, alpha-methylstyrene, ring-substituted methyl- or polymethyl-alpha-methylstyrenes, ring-substituted ethyl- or polyethyl-alpha-methylstyrenes, propyl- or polypropyl-alpha-methylstyrenes, butyl- or polybutyl-alpha-methylstyrenes, ring-substituted mixed polyalkyl-alpha-methylstyrenes wherein the alkyl groups differ from each other, ring-substituted chloro- or polychloro-alpha-methylstyrenes, ring-substituted alkyl- or polyalkyl chloro- or polychloro-alpha-methylstyrenes in which the alkyl group(s) contain(s) from one to four carbon atoms, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methyl-styrene, 2,4-dimethylstyrene, alpha-methylstyrene, p-chloro-styrene, etc.) are preferred from the standpoints of cost and availability.

The halophenoxyalkylsilanes of the present invention may be described by the following formula:

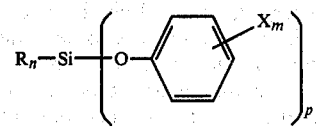

wherein R is selected from the group consisting of straight chain alkyl groups, branched alkyl groups and cycloalkyl groups having from 1 to 10 carbon atoms, X is a halogen selected from the group consisting of chlorine and bromine, n is an integer from 0 to 3, p is an integer from 1 to 4 and m is an integer from 1 to 5.

Preferably X is bromine and m is an integer from 3 to 5. More preferably X is bromine and m is 3. Preferably, R is a straight chain or branched alkyl having from 1 to 5 carbon atoms, more preferably, R is methyl or ethyl. The most preferred R is methyl. Preferably, n is the integer 1 or 2 and p is the integer 2 or 3. More preferably, both n and p are 2. The most preferred halophenoxyalkylsilane intended in the practice of the present invention is bis-(2,4,6-tribromophenoxy)dimethylsilane and is represented by the formula:

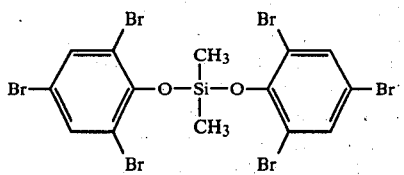

The halophenoxyalkylsilane flame retardants of the present invention are present in a sufficient quantity to impart flame retardant properties to the high impact polystyrene composition. Generally, quantities of from about 0.1 wt% to about 25 wt% based on the weight of the high impact polystyrene are sufficient to render a high impact polystyrene composition self-extinguishing and resistant to thermal degradation. Preferably, from about 5 wt% to about 25 wt% of the halophenoxyalkylsilane is used. More preferably, the amount of the flame retardant additive ranges from about 10 wt% to about 20 wt%.

An additional compound that may be added to the high impact polystyrene composition containing a halophenoxyalkylsilane flame retardant is antimony oxide. Antimony oxide is a well known flame retardant synergist. Antimony oxide exhibits synergistic effects only with halogen compounds. Antimony oxide is stable and can be blended at normal processing temperatures. There are at least three known oxides of antimony that are known for their synergistic effects. These include $Sb_2O_3$, $Sb_2O_4$ and $Sb_2O_5$. The most commonly used form of antimony oxide is $Sb_2O_3$.

The useful concentration of antimony oxide varies over a wide range. The optimum amount of antimony oxide to be used depends not only on the specific halogen, such as bromine or chlorine, but also on the type of halophenoxyalkylsilane selected. Antimony oxide is normally employed in a concentration of about 0.1 wt% to about 15 wt%, based on the weight of the high impact polystyrene. Preferably, the concentration of the antimony oxide is in the range of about 1 wt% to about 10 wt% and more preferably, about 3 wt% to about 6 wt%.

Other types of flame retardant synergists may also be present. These may include free radical generating compounds such as dicumyl peroxide, a conventional metal compound synergist, or an aliphatic or cycloaliphatic phosphite or thiophosphite. It is to be understood that the composition of this invention can have the usual fillers, dyes, pigments, plasticizers, antistatic agents, stabilizing agents, and the like incorporated therein, if desired. These compounds are well-known in the art.

There is no definite upper limit for the amount of total additives to be incorporated in the high impact polystyrene. Ordinarily, additives are used at the lowest level which will produce the least change in physical properties of the high impact polystyrene. The halophenoxyalkylsilanes of the present invention are especially efficient in maintaining good physical properties in the high impact polystyrene.

The production of the flame retardant composition of the present invention can be carried out in various manners. For example, mixtures of the high impact polystyrene compositions can be prepared by mixing the halophenoxyalkylsilane flame retardant with antimony oxide and other optional additives into the high impact polystyrene at an elevated temperature in an extrusion press or a kneader such as a Banbury mixer. The components can also be dissolved in a common solvent. The solution can be admixed with the polymer and then the solvent recovered. In the case of granular or bead-like plastic compositions, the surface of the granule may be coated.

The invention is demonstrated in the following examples, but it is to be understood that the invention is not limited to these specific examples.

EXAMPLE 1

Preparation of Bis-(2,4,6-tribromophenoxy)dimethylsilane

A 500 ml resin kettle equipped with a mechanical stirrer, a reflux condenser and a nitrogen flush assembly, was charged with 2,4,6-tribromophenol (132.2 g, 0.4 mole) and toluene (350 ml). The contents were heated and stirred under nitrogen to 45° C. A tan colored solution was obtained. All the remaining operations were performed under a continuous flow of nitrogen. When the clear solution was obtained at 45° C., N,N-dimethylaniline (5.0 ml) was added in three portions over a period of about ten minutes. The contents were heated to 50° C. and then dichlorodimethylsilane (25.8 g, 0.2 mole) was added dropwise over a period of 10–12 minutes and the pot temperature was allowed to rise slowly to 75°–80° C. at which time another 5.0 ml of N,N-dimethylaniline was introduced. When all the base had been added, heating was continued until the contents began to reflux at 110° C. After a total of 11 hours of reflux under nitrogen, the contents were brought down to room temperature and stripped of the solvent on the rotary evaporator followed by dilution with 300 ml of hexane, and stored under nitrogen at −5° C. overnight. The light gray product thus deposited was recrystallized twice from toluene to give colorless crystals weighing 75.2 g (52.2% yield). The melting point was found to be 124°–130° C. The identity of the compound was confirmed by elemental analysis which gave the following results. Calculated for $C_{14}H_{10}O_2Br_6Si$: C=23.42%, H=1.40%, Br=66.79%, Si=3.91% Found: C=23.95%, H=1.47%, Br=66.45%, Si=3.99%

EXAMPLE 2

Evaluation of HIPS Composition

The bis-(2,4,6-tribromophenoxy)dimethylsilane prepared in Example 1 was mixed with HIPS Gulf MA-1563 which is high impact polystyrene produced by Gulf Chemical Co. Antimony oxide was also added. The three components were mixed in a Brabender mixer at a temperature of 365° F. for ten minutes. The mixture was compression molded into plaques, cooled and cut into specimens for testing.

A comparison was conducted by replacing the flame retardant of Example 1 with Saytex 102, a registered trademark of Saytech, Inc., which is decabromobiphenyl oxide and Saytex BT-93, a registered trademark of Saytech, Inc., which is 1,2-bis-(tetrabromophthalimido)ethane. Sample 1 represents pure high impact polystyrene without any flame retardant component.

Table 1 contains the results of these tests. The quantities of ingredients as listed in Table 1 represent weight percent of the total formulation. The percent of bromine in each sample was calculated. The Oxygen Index Test is defined as the minimal volume fraction of oxygen in a slowly rising oxygen-nitrogen atmosphere that will sustain the candlelike burning of a stick of polymer. The higher the Oxygen Index of a molded article, the more flame retardant it is.

The UL-94 vertical burn test is used to classify polymer specimens as V-0, V-1, V-2 and burn. Polymer specimens are held vertically and ignited at the bottom. Classification is based on burn times, the presence or absence of flaming drip and the presence and extent of afterglow. The Izod impact test was conducted as described in ASTM D 256. A notch was cut in the narrow face of a ⅛"×½"×2" specimen. This notch was made following procedure A of ASTM D 618. The Izod impact strength indicates the energy that is required to break notched specimens under standard conditions. The Izod impact strength is calculated as ft.lb./in. of notch.

TABLE 1

| Evaluation of HIPS Composition | | | | |
|---|---|---|---|---|
| Sample | 1 | 2 | 3 | 4 |
| HIPS Gulf MA-1563 | 100 | 81 | 84 | 81 |
| Flame Retardant from Ex. 1 | — | 15 | — | — |
| Saytex 102 | — | — | 12 | — |
| Saytex BT-93 | — | — | — | 15 |
| Antimony Oxide | — | 4 | 4 | 4 |
| % Bromine in the Formulation | — | 10.01 | 9.99 | 10.07 |
| Oxygen Index | 18.5 | 27.20 | 26.1 | 29.30 |
| UL-94 (⅛") | | Burn | V-O | V-O | V-O |
| Izod impact (⅛") | | 1.6 | 1.26 | 0.16 | 0.13 |

In the Oxygen Index test of Sample 2, which contained the bis-(2,4,6-tribromophenoxy)dimethylsilane flame retardant from Example 1, no glow was observed. As indicated by Table 1, the high impact polystyrene formulation containing the bis-(2,4,6-tribromophenoxy)dimethylsilane had both good flame retardant properties and good physical properties unlike the other three samples.

We claim:

1. A flame retarded high impact polystyrene composition having improved Izod impact strength comprising a high impact polystyrene composition containing a flame retarding amount of a halophenoxyalkylsilane.

2. The flame retarded high impact polystyrene composition as recited in claim 1 containing antimony oxide.

3. The flame retarded high impact polystyrene composition as recited in claim 1 wherein said halophenoxyalkylsilane is bis-(2,4,6-tribromophenoxy)dimethylsilane.

4. The flame retarded high impact polystyrene composition as recited in claim 1 wherein said halophenoxysilane is present at a concentration of from about 0.01 wt% to about 25 wt% based on the weight of the high impact polystyrene.

* * * * *